US012264529B2

(12) United States Patent
Johansson et al.

(10) Patent No.: US 12,264,529 B2
(45) Date of Patent: Apr. 1, 2025

(54) SYSTEM FOR AUTOMATICALLY CLOSING A TRUNK LID OF A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Erik Lindberg Nilsson, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 245 days.

(21) Appl. No.: 17/870,991

(22) Filed: Jul. 22, 2022

(65) Prior Publication Data

US 2022/0412150 A1 Dec. 29, 2022

Related U.S. Application Data

(63) Continuation of application No. PCT/CN2021/073979, filed on Jan. 27, 2021.

(30) Foreign Application Priority Data

Jan. 30, 2020 (EP) .................................... 20154647

(51) Int. Cl.

*E05F 15/76* (2015.01)
*E05F 15/79* (2015.01)
*E05F 15/73* (2015.01)

(52) U.S. Cl.

CPC .............. *E05F 15/76* (2015.01); *E05F 15/79* (2015.01); *E05F 2015/763* (2015.01);

(Continued)

(58) Field of Classification Search

CPC ..... E05F 15/76; E05F 15/79; E05F 2015/763; E05F 2015/767; E05F 15/70; E05F 15/73;

(Continued)

(56) References Cited

U.S. PATENT DOCUMENTS 6,339,376 B1 * 1/2002 Okada .................... G08B 13/26 340/565
9,879,466 B1 1/2018 Yu (Continued)

FOREIGN PATENT DOCUMENTS

CN 104281937 A 1/2015
CN 105346507 A 2/2016

(Continued)

OTHER PUBLICATIONS

International Search Report from International Application No. PCT/CN2021/073979, mailed on Apr. 27, 2021, 2 pages.

(Continued)

*Primary Examiner* — James J Yang
(74) *Attorney, Agent, or Firm* — Tucker Ellis LLP

(57) ABSTRACT

A system for automatically closing a trunk lid of a vehicle. The system comprises a trunk sensor system configured for detecting items in a luggage trunk, a trunk lid actuator for automatic closing of the trunk lid, and a control unit connected to the trunk sensor system and to the trunk lid actuator. The control unit is arranged for statistically determining, based on a set of observations of a trunk interior space by means of the trunk sensor system in connection with termination of a set of vehicle travels, one or more items or combination of items that are frequently remaining in the luggage trunk after completed travel, while preferably taking into account the one or more items stored in the luggage trunk during the travel, detecting opening of the trunk lid, detecting current items in the luggage trunk by (Continued)

means of the trunk sensor system, and controlling the trunk lid actuator for automatic closing of the trunk lid when the current items correspond to said one or more items or combination of items that are frequently remaining in the luggage trunk after a journey. The disclosure also relates to a corresponding computer-implemented method for automatically closing a trunk lid of a vehicle luggage trunk.

11 Claims, 8 Drawing Sheets

(52) U.S. Cl.
CPC ..... *E05F 2015/767* (2015.01); *E05Y 2400/44* (2013.01); *E05Y 2400/456* (2013.01); *E05Y 2900/546* (2013.01); *E05Y 2900/548* (2013.01)

(58) Field of Classification Search
CPC ......... E05F 15/77; E05F 15/53; E05F 15/611; E05Y 2400/44; E05Y 2400/456; E05Y 2900/546; E05Y 2900/548; E05Y 2201/41; E05Y 2400/00; E05Y 2400/45; E05Y 2400/85
See application file for complete search history.

(56) References Cited

U.S. PATENT DOCUMENTS

| | | | | |
|---|---|---|---|---|
| 2002/0135196 | A1 | 9/2002 | Bingle | |
| 2003/0102688 | A1 | 6/2003 | Bingle | |
| 2010/0256875 | A1 | 10/2010 | Gehin | |
| 2012/0290177 | A1 | 11/2012 | Wagenhuber | |
| 2016/0222713 | A1 | 8/2016 | Jang | |
| 2017/0044816 | A1* | 2/2017 | Salter | B60J 5/101 |
| 2017/0175431 | A1* | 6/2017 | Bradley | G06Q 50/40 |

FOREIGN PATENT DOCUMENTS

| | | | |
|---|---|---|---|
| CN | 207920349 | U | 9/2018 |
| CN | 108779659 | A | 11/2018 |
| CN | 110191995 | A | 8/2019 |
| CN | 209837998 | U | 12/2019 |
| DE | 102010038705 | A1 | 2/2012 |
| DE | 102017200257 | A1 | 7/2017 |
| DE | 102018005293 | A1 | 1/2020 |
| EP | 2437962 | A1 | 4/2012 |
| KR | 20000025388 | A | 5/2000 |
| KR | 20150102769 | A | 9/2015 |
| WO | 2018023096 | A1 | 2/2018 |
| WO | 2018199380 | A1 | 11/2018 |

OTHER PUBLICATIONS

Tesla Forums, “Trunk auto close on walk-away,” dated Aug. 20, 2016, 7 pages.

* cited by examiner

| **Remaining item(s)** | |
|---|---|
| Shovel+Box | 72% |
| Shovel | 14% |
| Shovel+Bottle | 5% |
| Shovel+Bag | 3% |
| Box | 3% |

Fig. 4

| **Item** | **Remain** | **Removed** | **Not present** |
|---|---|---|---|
| **Showel** | 97% | 2% | 1% |
| **Box** | 76% | 22% | 2% |
| **Bottle** | 6% | 7% | 87% |
| **Bag** | 6% | 71% | 23% |

Fig. 5

| | **Bottle remain** | **Bottle removed** |
|---|---|---|
| **Box reamin** | 0% | 54% |
| **Box removed** | 46% | 0% |

Fig. 6

| When transporting Shovel+Box+Bag | |
|---|---|
| Shovel+Box remain | 92% |
| Shovel+bag remain | 4% |
| Shovel remain | 3% |
| Box remain | 1% |
| Box+bag remain | 0% |
| Bag remain | 0% |

Fig. 7

| When transporting Shovel+Box+Bottle | |
|---|---|
| Shovel+Box remain | 50% |
| Shovel+bottle remain | 50% |
| Shovel remain | 0% |
| Box remain | 0% |
| Box+bag remain | 0% |
| Bag remain | 0% |

Fig. 8

SYSTEM FOR AUTOMATICALLY CLOSING A TRUNK LID OF A VEHICLE

RELATED APPLICATION DATA

This application is a continuation of International Patent Application No. PCT/CN2021/073979, filed Jan. 27, 2021, which claims the benefit of European Patent Application No. 20154647.0, filed Jan. 30, 2020, the disclosures of which are incorporated herein by reference in their entireties.

TECHNICAL FIELD

The present disclosure relates to a system for automatically closing a trunk lid of a vehicle, and a computer-implemented method for automatically closing a trunk lid of a vehicle luggage trunk.

The system and method according to the disclosure can for example be implemented in relation to a car, but the system and method are not restricted to this particular type of vehicle, but may alternatively be installed or implemented in other types of vehicles, such as in particular delivery vehicles, taxi vehicles, buses, or the like.

BACKGROUND

There is a continuous demand for improved smart features in vehicles, which features enable simplified handling and improved user-friendliness for vehicle users. For example, document US 2010/0256875 A1 shows a solution for automatic closure of a motor vehicle tailgate fitted with at least one presence sensor of an element in a detection zone. However, even if this solution may provide a certain level of simplified handling and improved user-friendliness for vehicle users, the is still a demand for a further improved system and method for automatic closure of the trunk lid, especially in view of a more flexible and smarter solution.

SUMMARY

An object of the present disclosure is to provide a system and method for automatic closure of a trunk lid that involves a more flexible and smarter control of when to initiate the trunk lid closing sequence. This object is at least partly achieved by the features of the independent claims.

According to a first aspect of the present disclosure, there is provided a system for automatically closing a trunk lid of a vehicle. The system comprising a trunk sensor system configured for detecting items in a luggage trunk, a trunk lid actuator for automatic closing of the trunk lid, and a control unit connected to the trunk sensor system and to the trunk lid actuator. The control unit is arranged for statistically determining, based on a set of observations of a trunk interior space by means of the trunk sensor system in connection with termination of a set of vehicle travels, the item(s) or combination(s) of items that are frequently remaining in the luggage trunk after completed travel, while preferably taking into account the item(s) stored in the luggage trunk during the travel. The control unit is further configured for detecting opening of the trunk lid, and detecting current item(s) in the luggage trunk by means of the trunk sensor system, and controlling the trunk lid actuator for automatic closing of the trunk lid when the current item(s) corresponds to said item(s) or combination(s) of items that are frequently remaining in the luggage trunk after a journey.

According to a second aspect of the present disclosure, there is provided a computer-implemented method for automatically closing a trunk lid of a vehicle luggage trunk. The method comprising: statistically determining, based on a set of observations of a trunk interior space by means of the trunk sensor system in connection with termination of a set of vehicle travels, the item(s) or combination(s) of items that are frequently remaining in the luggage trunk after completed travel, while preferably taking into account the item(s) stored in the luggage trunk during the travel; detecting opening of a trunk lid; detecting current items in the luggage trunk by means of the trunk sensor system; and controlling a trunk lid actuator for automatic closing of the trunk lid when the current item(s) corresponds to said item(s) or combination(s) of items that are frequently remaining in the luggage trunk after a journey.

Specifically, by means of the system and method for automatic closure of a trunk lid described above, a smart automatic closing functionality of the trunk lid may be accomplished, thereby alleviating unloading of cargo from the trunk because the user does no longer need to manually initiating the closing of the trunk lid. This is particularly advantageous when the user is unloading and carrying away one or more cargo items from the vehicle using both hands simultaneously, because these situations otherwise typically requires that the user temporarily puts down the cargo item(s) on the ground for freeing a hand for manual closing of the trunk lid. However, temporarily putting down the cargo on the ground is undesirable due to potentially heavy and non-ergonomic handling of the cargo, as well as potentially damaging and/or generally undesirable effect on the cargo caused by dirt, moisture, mud or the like on the ground. However, with the system and method for automatic closure of a trunk lid described above, a smart automatic closing functionality of the trunk lid may be accomplished that enables the user to simply open the trunk lid, grab the cargo items using for example both hands and walking away from the vehicle, wherein the system and method accomplishes automatic closure of the trunk lid at a suitable time point, in particular when only cargo items that are normally remaining in the cargo trunk are left, such that a more flexible and smarter control of when to initiate the trunk lid closing sequence is provided.

Furthermore, according to a third aspect of the present disclosure, there is provided a system for automatically closing a trunk lid of a vehicle, wherein the system comprises a trunk sensor system configured for detecting items in a luggage trunk, a trunk lid actuator for automatic closing of the trunk lid, and a control unit connected to the trunk sensor system and to the trunk lid actuator.

Moreover, the system further comprises a vehicle exterior sensor system, wherein said control unit is arranged for detecting opening of the trunk lid, detecting, by means of the trunk sensor system, removal of at least one item from the trunk by a user, tracking a location of said user by means of the vehicle exterior sensor system, and controlling the trunk lid actuator for automatic closing of the trunk lid when said user is departing from the vehicle.

Alternatively, the system further comprises a vehicle key fob or a mobile communication device having a virtual vehicle key for vehicle access, wherein said control unit is arranged for detecting opening of the trunk lid, detecting, by means of the trunk sensor system, removal of at least one item from the trunk by a user, monitoring a distance between the vehicle and the vehicle key fob, or between the vehicle and the mobile communication device, and controlling the trunk lid actuator for automatic closing of the trunk lid when said distance exceeds a threshold level.

Still more alternatively, the system may further comprises a remote smart home device, wherein said control unit is arranged for detecting opening of the trunk lid, detecting, by means of the trunk sensor system, removal of at least one item from the trunk by a user, controlling the trunk lid actuator for automatic closing of the trunk lid when receiving information from the remote smart home device indicating that the user is about to enter, or has already entered, a building or apartment associated with the smart home device.

Furthermore, according to a fourth aspect of the present disclosure there is provided a computer-implemented method for automatically closing a trunk lid of a vehicle luggage trunk, the method comprising detecting opening of a trunk lid, and detecting, by means of a trunk sensor system, removal of at least one item from the trunk by a user.

Furthermore, the method comprises tracking a location of said user by means of a vehicle exterior sensor system, and controlling a trunk lid actuator for automatic closing of the trunk lid when said user is departing from the vehicle.

Alternatively, the method further comprises monitoring a distance between the vehicle and a vehicle key fob, or between the vehicle and a mobile communication device having a virtual vehicle key for vehicle access, and controlling a trunk lid actuator for automatic closing of the trunk lid when said distance exceeds a threshold level.

Still more alternatively, the method further comprises controlling the trunk lid actuator for automatic closing of the trunk lid when receiving information from a remote smart home device indicating that the user is about to enter, or has already entered, a building or apartment associated with the smart home device.

These alternative solutions to the same problem, i.e. to provide a more flexible and smarter control of when to initiate the trunk lid closing sequence, each define a system and method for automatic closure of a trunk lid that enables the user to simply open the trunk lid, grab the cargo items using for example both hands and walking away from the vehicle, wherein the system and method accomplishes automatic closure of the trunk lid at a suitable time point, in particular when a distance between the vehicle and the vehicle key fob, or between the vehicle and the mobile communication device, exceeds a threshold level, or when receiving information from a remote smart home device indicating that the user is about to enter, or has already entered, a building or apartment associated with the smart home device, or when said user is departing from the vehicle. As a result, a more flexible and smarter control of when to initiate the trunk lid closing sequence is provided.

Further advantages are achieved by implementing one or several of the features of the dependent claims.

In some example embodiments, the system may further comprise a vehicle position detection system for detecting a position of the vehicle, wherein the control unit is configured for: determining a timing of the closure of the trunk lid upon said departure of the user from the vehicle taking into account said detected vehicle position; or determining said threshold level taking into account said detected vehicle position; or determining a timing of the closure of the trunk lid upon receiving said information from a remote smart home device indicating that the user is about to enter, or has already entered, a building or apartment associated with the smart home device, taking into account said detected vehicle position. Thereby, the system and method is provided with increased smartness, such that an even more user-friendly automatic closure of the trunk lid is accomplished.

In some example embodiments, the control unit is arranged for controlling the trunk lid actuator for automatic closing of the trunk lid after a certain time period, irrespective of detected current items within the luggage trunk. Thereby, lengthy time periods of open cargo trunk caused by estimation errors with respect to remaining items in the trunk may be eliminated.

In some example embodiments, the trunk sensor system includes at least one of, or a combination of, a camera, a lidar sensor, a laser-scanning sensor, a radar sensor, and an ultrasound sensor. These sensor devices enable an accurate and reliable detection and identification of the items in the trunk.

In some example embodiments, the remote smart home device is any of, or a combination of, an interior and/or exterior surveillance camera, a house or apartment security system, a house or apartment entrance door lock, a house or apartment entrance door-opening detector, a house or apartment interior and/or exterior lighting system, a refrigerator, a virtual assistant. These remote smart home devices provide accurate and reliable information about the current location of the user.

The disclosure also relates to a vehicle comprising a system as described above.

In some example embodiments, the trunk sensor system is located within an interior trunk space of the vehicle. Thereby, the trunk sensor system is located close to any cargo items being stored and/or transported in the trunk space, such that a reliable and accurate automatic detection and identification of said items may be accomplished by the control unit.

In some example embodiments, the method further comprises detecting a position of the vehicle, wherein a timing of the closure of the trunk lid upon said departure of the user from the vehicle is determined taking into account said detected vehicle position; or said threshold level is determined taking into account said detected vehicle position; or a timing of the closure of the trunk lid upon receiving said information from a remote smart home device indicating that the user is about to enter, or has already entered, a building or apartment associated with the smart home device, is determined taking into account said detected vehicle position. Thereby, the system and method is provided with increased smartness, such that an even more user-friendly automatic closure of the trunk lid is accomplished.

In some example embodiments, the method further comprises controlling the trunk lid actuator for automatic closing of the trunk lid after a certain time period, irrespective of detected current items within the luggage trunk. Thereby, lengthy time periods of open cargo trunk caused by estimation errors with respect to remaining items in the trunk may be eliminated.

In some example embodiments, the method further comprises providing a trunk sensor system within an interior trunk space. Thereby, the trunk sensor system is located close to any cargo items being stored and/or transported in the trunk space, such that a reliable and accurate automatic detection and identification of said items may be accomplished by the control unit.

In some example embodiments, the trunk sensor system includes at least one of, or a combination of, a camera, a lidar sensor, a laser-scanning sensor, a radar sensor, and an ultrasound sensor. These sensor devices enable an accurate and reliable detection and identification of the items in the trunk.

In some example embodiments, the remote smart home device is any of, or a combination of, an interior and/or exterior surveillance camera, a house or apartment security system, a house or apartment entrance door lock, a house or apartment entrance door-opening detector, a house or apartment interior and/or exterior lighting system, a refrigerator, a virtual assistant. These remote smart home devices provide accurate and reliable information about the current location of the user Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIG. 4-8 show tables with statistical data of items stored in the luggage trunk.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The disclosure relates to an improved system and method for automatic closure of the trunk lid, especially in view of a more flexible and smarter solution. For setting the improved system and method in a context, reference is made to FIGS. 1A and 1B, which schematically shows a side view of an example vehicle 1, such as car, having a trunk lid 2 in a closed and open state, respectively. As mentioned above, the disclosure is however not limited to this type of vehicle, and the example vehicle of FIGS. 1A and 1B merely represents one example vehicle out of many different alternative vehicles, in which the system and method may be implemented.

Figure 1A:
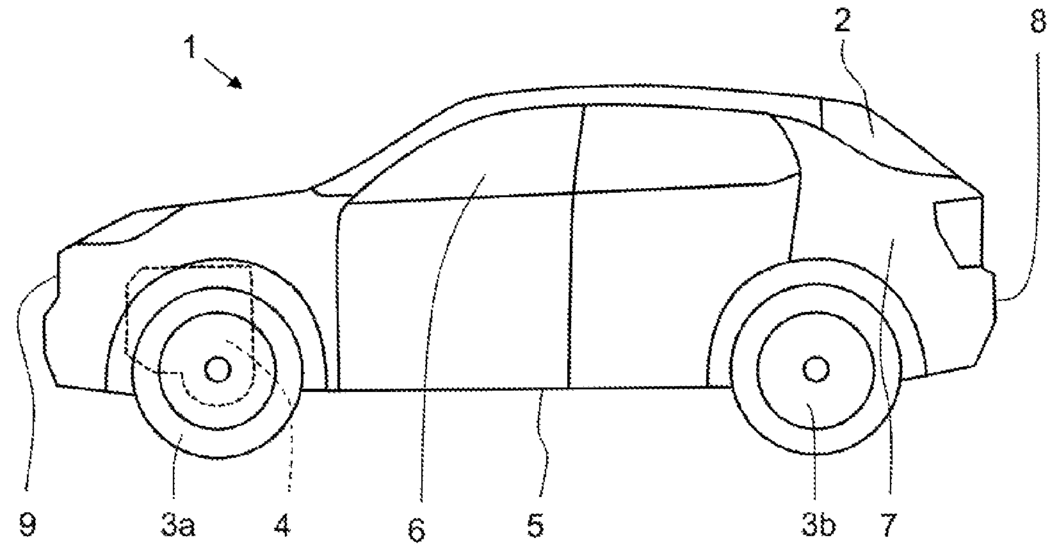
FIG. 1A-1B show schematically a side view of a vehicle with the trunk lid in closed and open state, respectively.
Figure 1B:
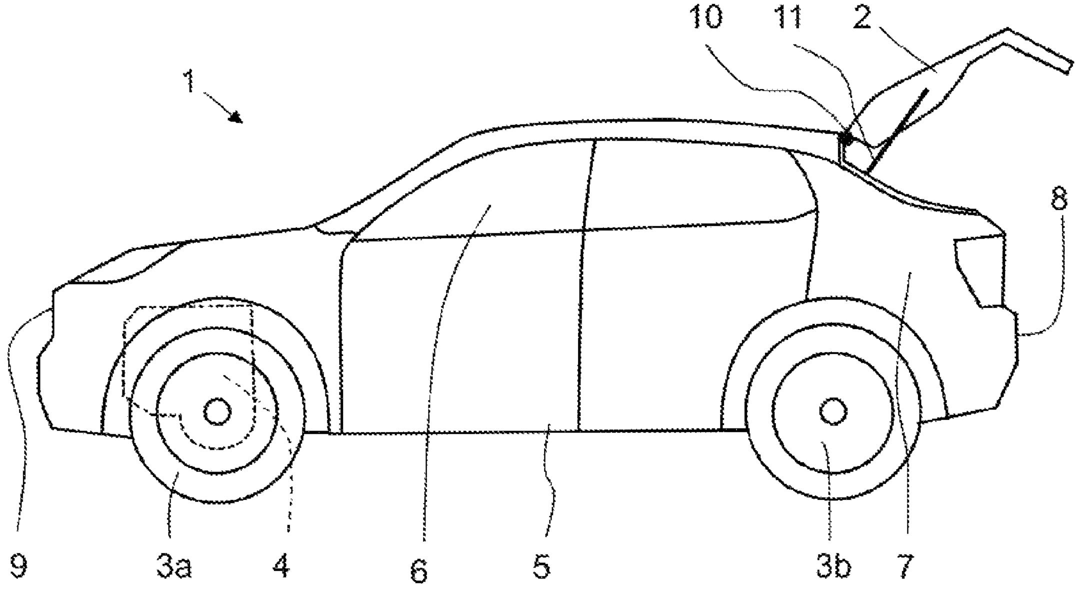

The example vehicle of FIGS. 1A and 1B has front wheels 3*a*, rear wheels 3*b*, a powertrain 4 including a propulsion motor, such as an electric motor and/or a combustion engine, and a vehicle body 5 including a passenger compartment 6 and a luggage trunk 7, i.e. a luggage compartment. The luggage trunk 7 may be positioned in the rear 8 of the vehicle 1, as shown in FIGS. 1A and 1B, but other locations are equally possible depending on vehicle layout. Consequently, the luggage trunk 7 may alternatively be positioned in the front 9 of the vehicle 1, or at the side of the vehicle 1, or somewhere else.

Furthermore, in the context of the present disclosure it should be understood that the term "trunk lid" may be used in the same context as the term "trunk door" or "trunk closure" and to comprise the same meaning. For example, the term may be used to indicate a trunk closure or trunk door located in the front 9, at the side, or in the rear 8 of the vehicle 1. Hence, the system and method for automatically closing a trunk lid 2 of a vehicle may relate to automatic closure of a trunk door associated with an opening of a luggage trunk 7 located for example in the front, rear or at the side of a vehicle 1.

In the example vehicle of FIGS. 1A and 1B, the trunk lid 2 is moveable between a closed position, as shown in FIG. 1A, and an open position, as shown in FIG. 1B. With the trunk lid 2 in the open position, a user may load or unload baggage items and/or various types of cargo into, or out from, the luggage trunk 7.

The trunk lid 2 is for example attached to the vehicle body 6 via one or more pivot joints 10, i.e. hinges, for enabling movement of the trunk lid 2 between the closed and open position. Moreover, a trunk lid actuator 11 is provided for enabling automatic closing of the trunk lid 2. The trunk lid actuator 11 is for example a motorized actuator that controls motion of the trunk lid 2 from the open to the closed position. The trunk lid actuator is typically attached on one side to the vehicle body 5, and on the other side to the trunk lid 2. The trunk lid actuator may for example be a linear actuator, such as an electrically powered, pneumatically powered, hydraulically powered linear actuator, or the like. Alternatively, trunk lid actuator 11 may be a rotary powered actuator that is located in the pivot joint 10 of the trunk lid 2.

The rotary axis of the pivot joint 10 may be arranged horizontally, as shown in FIGS. 1A and 1B, but the rotary axis of the pivot joint 10 may alternatively be arranged vertically, such that the trunk lid pivots like a conventional door instead, such as vehicle side door.

Still more alternatively, the trunk lid 2 may in certain types of vehicles move along mainly a linear and/or translatory motion path, such as a sliding door.

Figure 2:
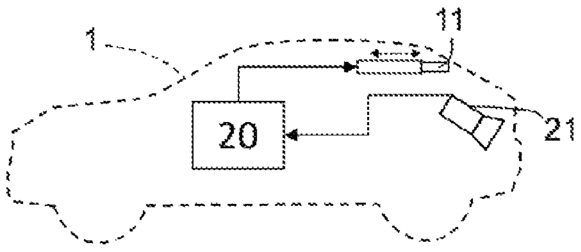
FIG. 2 shows schematically an overview of the system according to an example embodiment of the disclosure.

With reference to FIG. 2, the system for automatically closing a trunk lid 2 of a vehicle 10 typically comprises a control unit 20, a trunk sensor system 21 and the trunk lid actuator 11. The control unit 20 may for example be connected to the trunk sensor system and to the trunk lid actuator via wired or wireless communication channels.

A first example embodiment of the system for automatically closing a trunk lid of a vehicle is hereinafter described with reference to FIGS. 3A and 3B, which schematically shows, as seen from a rear side of the vehicle 1, an interior trunk space of the luggage trunk 7, with the trunk lid 2 in the open position and with various content in the luggage trunk 7.

The interior trunk space of the luggage trunk 7 is for example defined by a luggage trunk bottom 30, a luggage trunk left side wall 31, a luggage trunk right side wall 32, a rear surface 33 of a vehicle back seat, a luggage trunk roof 34, and an interior surface of the trunk lid 2.

Figure 3A:
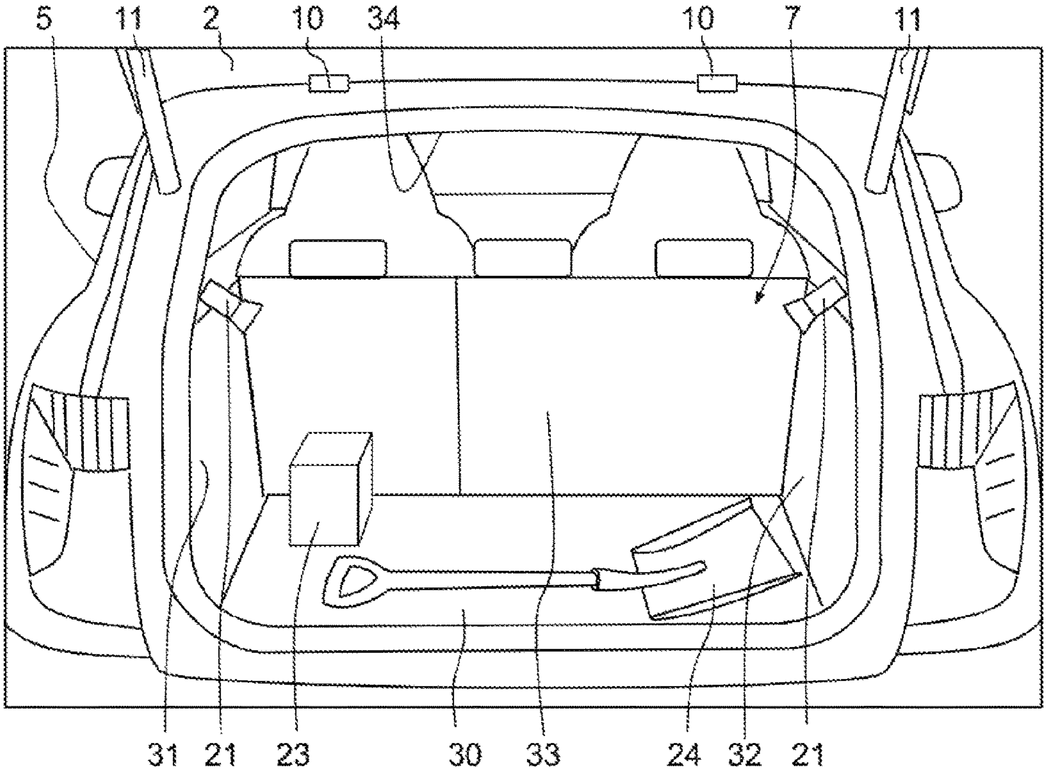
FIG. 3A-3B show schematically the content of the trunk in various states.
Figure 3B:
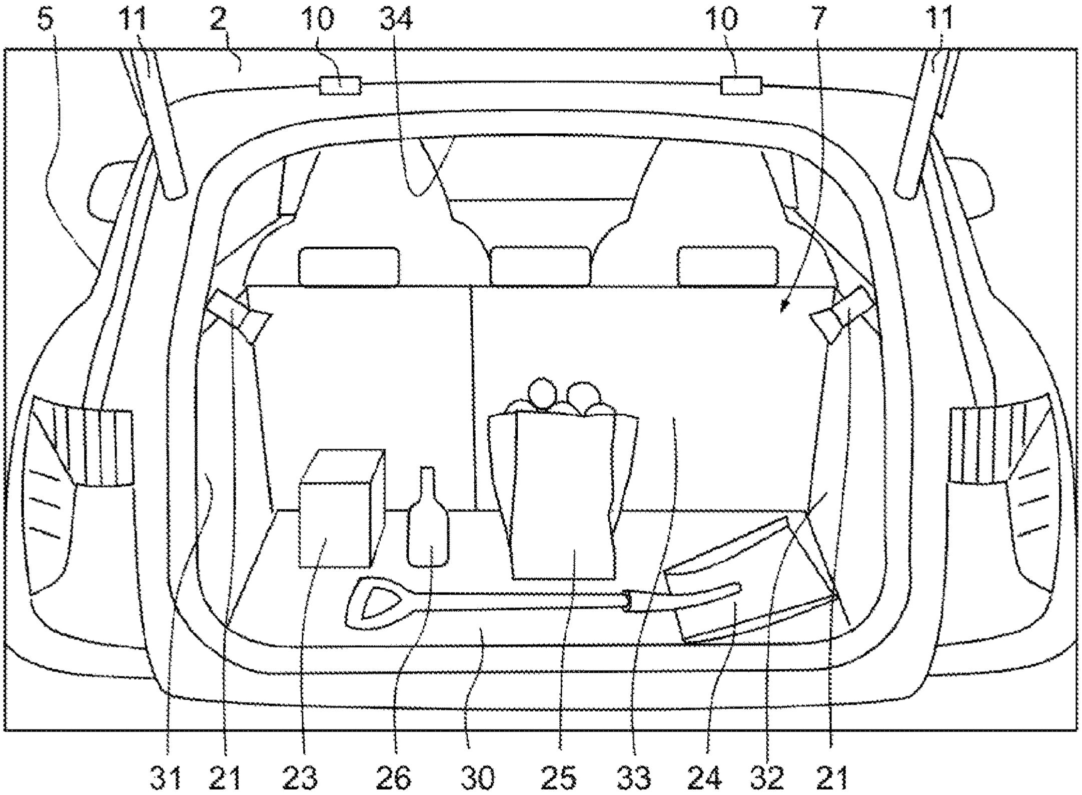

According to the example of FIGS. 3A and 3B, the luggage trunk illustrated in FIG. 3A includes various items, specifically a box 23 and a shovel 24, and the luggage trunk illustrated in FIG. 3B includes the box 23, the shovel 24, and additionally a bag 25 and a bottle 26.

According to a first example embodiment, the system for automatically closing a trunk lid 2 of a vehicle 1 comprises a trunk sensor system 21 configured for detecting items 23-26 in the luggage trunk 7, a trunk lid actuator 11 for automatic closing of the trunk lid 2, and a control unit 20 connected to the trunk sensor system 21 and to the trunk lid actuator 11. Moreover, said control unit 20 is arranged for statistically determining, based on a set of observations of a trunk interior space by means of the trunk sensor system in connection with termination of a set of vehicle travels, the item(s) or combination(s) of items that are frequently remaining in the luggage trunk after completed travel, while preferably taking into account the item(s) stored in the luggage trunk during the travel. Said control unit 20 is further arranged for detecting opening of the trunk lid 2, detecting current items 23-26 in the luggage trunk 7 by means of the trunk sensor system 21, and controlling the trunk lid actuator 11 for automatic closing of the trunk lid 2 when the current item(s) corresponds to said item(s) or combination(s) of items that are frequently remaining in the luggage trunk after a journey.

The trunk sensor system 21 may for example include some type of sensor device(s) that are capable of detecting and identifying current items stored within the luggage trunk. For example, the trunk sensor system may include at least one of, or a combination of, a camera, a lidar sensor, a laser-scanning sensor, a radar sensor, or an ultrasound sensor. The trunk sensor system 21 may additionally include an odour sensor and/or a sound sensor for acquiring additional information that may be used for detecting and identifying current items stored within the luggage trunk.

The sensor device(s) of the trunk sensor system 21 in form of for example one or more cameras, lidar sensors, laser scanning sensors, radar sensors, or ultrasound sensors, or combination thereof, are typically located within the interior trunk space of the vehicle 1 for enabling proper detection and identification of the currently stored items. For example, the sensor devices may be mounted on, or embedded within, the luggage trunk left side wall 31, the luggage trunk right side wall 32, the rear surface 33 of a vehicle back seat, the luggage trunk roof 34, and/or the interior surface of the trunk lid 2.

In the example embodiment of FIGS. 3A and 3B, the trunk sensor system 21 includes two cameras, one mounted on the luggage trunk left side wall 31, and one mounted on the luggage trunk right side wall 32. This positioning of the trunk sensor system 21 enables proper detection and identification of the items within the luggage trunk also when a luggage trunk cover (not showed) is installed in the luggage trunk 7.

The detection and identification of items within the luggage trunk 7 may be performed by various methods, such as in particular image recognition. Image recognition may for example involve the following steps: Image acquisition by means of the trunk sensor system, such as for example by means of the two cameras according to the example of FIGS. 3A and 3B; and subsequent extraction and identification of the various items of the acquired image(s). The identification step may for example be performed by running a classification algorithm based on a trained neural network for enabling the image recognition software to classify detected items as box, shovel, bottle or bag, or the like.

The training of a classification algorithm for proper and accurate identification and classification may for example, but not strictly necessarily, involve analysis of several hundreds, thousands or even millions of images of a luggage trunk having one or more items, or an empty luggage trunk, together with associated information about what items are actually available within those images. Thereby, the classification algorithm may learn to extract relevant features from the images needed for correctly and accurately classifying images as including certain items, such as shovel, box, bottle or bag, etc.

The observation of item(s) or combination(s) of items that are frequently remaining in the luggage trunk after completed travel may for example be performed each time vehicle becomes locked and parked, or more seldom, such as each second time, third time or fourth time, or even less frequent.

The control unit 20 is typically arranged for, but not strictly limited to, detecting opening of the trunk lid 2 primarily in connection with vehicle parking. Hence, detection of opening of the trunk lid is primarily performed after use of vehicle.

Similarly, detection of current items 23-26 in the luggage trunk 7 is generally performed in connection with opening of the lid, such as for example slightly before or slightly after lid opening.

The automatic closing strategy of the trunk lid according to the first example embodiment involves detection and identification of items in the luggage trunk 7, and automatic closing the trunk lid when the remaining item(s) in the luggage trunk corresponds to one or more items or a combination of items that are statistically frequently allowed to remain in the luggage trunk after a journey, i.e. when the item(s) that are frequently not stored in the luggage trunk 7 have been removed from the luggage trunk 7. Thereby, a user may open the trunk lid, grab the items that are normally not stored within the luggage trunk, such as for example one or more shopping bags with groceries, and subsequently leave the vehicle with the trunk lid 2 open. The control unit will then determine that only items that are normally stored in the vehicle are still available in the luggage trunk, and thus control the trunk lid actuator 11 to perform automatic closing of the trunk lid 2. As a result, the user does not need to worry or be concerned with manual closing of the trunk lid 2, thereby providing an improved system for automatic closure of the trunk lid, especially in view of a more flexible and smarter solution.

The new system with automatic closure of the trunk lid 2 is particularly beneficial when the user for example has both hands occupied for carrying items, because the user may then avoid having to temporarily put down any item on the ground outside of the vehicle for freeing a hand for closing of the trunk lid 2, considering that the item may be damaged or harmed by putting it down on the ground, in particular on a wet, snowy or icy ground, or during high ambient wind conditions, or the like.

As mentioned above, the control unit 20 is arranged for statistically determining, based on a set of observations of a trunk interior space by means of the trunk sensor system in connection with termination of a set of vehicle travels, the item(s) or combination(s) of items that are frequently remaining in the luggage trunk after completed travel, while preferably taking into account the item(s) stored in the luggage trunk during the travel.

In other words, the control unit 20 may for example after each time the trunk lid is opened and subsequently closed in connection with vehicle end of travel perform an observation of the luggage trunk for identifying the items therein. The control unit may then, based on a large set of observations and suitable statistical analysis, determine which item(s) or combination(s) of items are frequently remaining in the luggage trunk after completed travel.

FIG. 4 shows a table with a simplified example result of such a set of observations, such as for example 1000 observations derived from 1000 occasions of end of travel, determined for example by parking and locking of the vehicle. The table defines that in 72% of the end of travel occasions, the items "Shovel" and "Box" remained in the luggage trunk after closure of the trunk lid, and that in only 14% of the end of travel occasions, only the item "Shovel" remained in the luggage trunk after closure of the trunk lid. Based on this statistics, one may conclude that automatic closure of the trunk lid when only the items "Shovel" and "Box" remain in the luggage trunk appears to correspond with a reasonable accuracy with the will of the user.

For further improving the accuracy and reliability in automatic closure of the trunk lid 2, the control unit may be configured for also taking into account the item(s) stored in the luggage trunk during the travel, because thereby it is possible to determined what item are being frequently removed from the luggage trunk.

FIG. 5 shows, as a simplified example, a table of items and their respective frequency in the luggage trunk, based on a large set of such observations, such as for example 1000 observations derived from 1000 occasions of end of travel, determined for example by parking and locking of the vehicle. It can be concluded from the table that the item "Shovel" and "Box" are nearly always present (99% and 98%, respectively) during the journey, i.e. nearly always brought along for the journey. It can also be concluded that the item "Shovel" nearly always (97%) is allowed to remain in the luggage trunk upon parking and locking of the vehicle, while the item "Box" is allowed to remain in the luggage trunk in 76% of the occasions and removed from the luggage trunk by the user before locking in 22% of the occasions.

The control unit may thus statistically determine that both the item "Shovel" and item "Box" are relatively frequently stored in the luggage trunk 7 when the vehicle 1 is locked and parked after a journey, and the control unit may therefore control the trunk lid actuator 11 for automatic closing of the trunk lid 2 when the items "Shovel" and "Box" remain in the luggage trunk after a journey.

It can further be concluded from the table of FIG. 5 that the item "Bag" is brought along on the journey in 77% of the occasions, and that the item "Bag" is frequently removed from the luggage trunk (71% of the occasions) when the vehicle is parked and locked. It can thus be concluded that the item "Bag" rather frequently is removed from the luggage trunk.

It can further be concluded from the table of FIG. 5 that the item "Bottle" rather seldom is brought along on the journey (13% of occasions), and that the item "Bottle" was allowed to remain in the luggage trunk in 6% of the occasions, and it was removed from the luggage trunk in 7% of the occasion. In other words, in those occasions when the item "Bottle" is included in the luggage trunk during the journey (13%), it was removed from the luggage trunk in about 50% of those occasions. It is thus difficult to derive any reliable conclusion whether the item "Bottle" should be remain in the luggage trunk or not, thereby making a it difficult for the control unit to reliably control closure of the trunk lid at correct instances.

However, the control unit may use statistical models of the user's behaviour for providing better and more accurate and reliable estimations of the user's preference, based on past events and user behaviour. For example, the control unit may analyze cross-correlation between various items in an effort for providing more reliable and accurate estimation of the user's preference.

For example, FIG. 6 shows cross-correlation between the items "Bottle" and "Box" based on those cases where both said items were included during the travel, and this statistical information strongly indicates that either the item "Box" or the item "Bottle" is frequently removed from the luggage trunk 2. In other words, based on the cross-correlation statistical data of FIG. 6, the control unit may be configured for controlling the trunk lid actuator 11 for automatic closing of the trunk lid 2 when one of the items "Bottle" and "Box" have been removed, in those cases where both said items are included during the travel.

Another way for illustrating how to derive useful rules for controlling the closure of the trunk lid based on the statistical data collected from a large set of travels is shown in FIG. 7 and FIG. 8, which shows simplified tables with the statistical outcome when transporting a certain combination of items.

For example, with reference to FIG. 7, when transporting the item combination "Shovel", "Box" and "Bag", the user frequently removes the item "Bag" upon parking the vehicle, and subsequently closes the trunk lid 2. Consequently, the control unit may with high accuracy and reliability be configured for controlling the trunk lid actuator 11 for automatic closing of the trunk lid 2 when the item "Bag" has been removed from the trunk, and merely the items "Shovel" and "Box" remain in the luggage trunk. However, if the user instead removes the item "Box" or "Shovel", there is no clear statistically confirmed rule to follow, and the control unit may be configured to leave closing of the trunk lid to the user.

Similarly, with reference to FIG. 8, when transporting the item combination "Shovel", "Box" and "Bottle", the user frequently removes either the item "Box" or the item "Bottle" upon parking the vehicle. Consequently, the control unit may with high accuracy and reliability be configured for controlling the trunk lid actuator 11 for automatic closing of the trunk lid 2 when either the item "Box" or the item "Bottle" has been removed from the trunk. However, if the user instead removes the item "Shovel", there is no clear statistically confirmed rule to follow, and the control unit may be configured to leave closing of the trunk lid to the user.

Clearly, various options for determining suitable control of the trunk lid based on statistical data on remaining and removed items from the luggage trunk are available, and a suitable statistical model may be used for deriving appropriate control rules for the control unit.

For example, according to some example embodiments, the system for automatic closure of the trunk lid based on statistical data on remaining and removed items from the luggage trunk 7, and the use of a suitable statistical model for deriving appropriate control rules for the control unit 20, may additionally take the vehicle parking position and/or vehicle parking category into account when controlling the trunk lid actuator 11 for automatic closing of the trunk lid 2. In other words, the collected statistic data on remaining and removed items from the luggage trunk 7 may be complemented with corresponding vehicle position data and/or parking category data. Alternatively, separate statistical data on remaining and removed items from the luggage trunk 7 may be collected for each commonly used vehicle parking position and/or parking category.

As a result, the system for automatic closure of the trunk lid based on statistical data on remaining and removed items from the luggage trunk 7 may, for a certain set of remaining items in the luggage trunk 7, arrive at different control of the trunk lid actuator 11 for automatic closing of the trunk lid 2 depending on where the vehicle is parked, e.g. at home, at work, at a super market, etc.

For example, the system for automatic closure of the trunk lid may initiate automatic closing of the trunk lid 2 first when all shopping bags 25 are removed from the luggage trunk 7 when parking at home, but said system for automatic closure of the trunk lid may initiate automatic closing of the trunk lid 2 despite that said shopping bags 25 still remain in the luggage trunk 7 when parking for example at preschool, because the user tends to always remove the shopping bags 25 when arriving at home but not when picking up a child at preschool. Similarly, the system for automatic closure of the trunk lid may initiate automatic closing of the trunk lid 2 first when the training bag is removed from the luggage trunk 7 when parking at the fitness center, but said system for automatic closure of the trunk lid may initiate automatic closing of the trunk lid 2 despite that said training bag still remain in the luggage trunk 7 when parking for example at work, because the user tends to always remove the training bag when arriving at the fitness center, but never when parking at work.

The control unit may additionally be configured to learn from those instances when for example the automatic closure of the trunk lid by the control unit was either stopped or when the trunk lid was reopened by the user, and one or more additional items were removed from the luggage trunk, or when the trunk lid closure was initiated by the user before trunk lid closure was initiated by the control unit. In other words, the control unit may be configured to detect instances when the automatic closure of the trunk lid by the control unit were overruled or appeared to be inappropriate by the user, and to deduct teaching from these instances based on user behavior, detected items in the trunk during travel and removed items from the trunk. Moreover, the control unit may additionally be configured to automatically change its operating behavior based on said deducted teaching.

In certain example embodiments, the control unit may be additionally configured for controlling the trunk lid actuator for automatic closing of the trunk lid after a certain time period has passed from opening of the trunk lid, irrespective of which items are still available within the luggage trunk. This functionality may thus operate as a time-out feature that automatically controls closing of the trunk lid after a certain time period. This may be useful when the control unit cannot draw any statistically reliable conclusion about when to initiate automatic closure of the trunk lid, but the time period indicates that the user has already removed the desired content from the luggage trunk and the trunk lid may thus be closed.

This approach for controlling closure of the trunk lid may be further developed by also taking vehicle position into account when determining the length of said certain time period. For example, when the vehicle is parking at a calm and safe neighborhood the time period may be relatively long, such as for example 1-5 minutes, because the risk for abuse, theft or other undesirable exploitation of the open vehicle by unauthorized persons is low. On the other hand, when the vehicle is parking at a busy and less safe neighborhood the time period may be relatively short, such as for example 0.5-1 minute, because the risk for abuse, theft or other undesirable exploitation of the open vehicle by unauthorized persons is then potentially higher.

As described more in detail below, the vehicle parking position may be obtained by means of a vehicle position detection system, such as a GPS-device, and/or by detecting a parking category, such as home, work, super market or the like, based on exterior environmental information collected by for example a vehicle exterior sensor system.

Some further example embodiments of the system for automatically closing a trunk lid of a vehicle will hereinafter be described with reference specifically to FIGS. 9-11, which shows automatic closure of the trunk lid when the vehicle user is deemed departing from the vehicle, in particular departing from an immediate area of the vehicle, or when a distance between a key fob or a user's mobile device or the like, and the vehicle, exceeds a threshold level.

In particular, according to one example embodiment of the system for automatically closing a trunk lid of a vehicle, with reference to FIGS. 1A-3B and 9-11, the system comprises a trunk sensor system 21 configured for detecting items 23-26 in a luggage trunk 7, a trunk lid actuator 11 for automatic closing of the trunk lid 2, and a control unit 20 connected to the trunk sensor system 21 and to the trunk lid actuator 11, wherein the system further comprises a vehicle exterior sensor system 40, and wherein said control unit 20 is arranged for detecting opening of the trunk lid 2, detecting, by means of the trunk sensor system 21, removal of at least one item from the trunk by a user 41, tracking a location of said user 41 by means of the vehicle exterior sensor system 40, and controlling the trunk lid actuator 11 for automatic closing of the trunk lid 2 when said user 41 is departing from the vehicle 1.

Consequently, the present example embodiment does not necessarily involves any estimation of one or more items or a combination of items that are statistically frequently allowed to remain in the luggage trunk after a journey and subsequent comparison with current items in the luggage trunk 7 for determining appropriate control the trunk lid actuator 11 to perform automatic closing of the trunk lid 2. Instead, the present example embodiment relies on tracking location of the user of the vehicle relative to the vehicle. The term "user" herein refers to the person opening the trunk lid 2 and removing at least one item from the trunk.

When the user 41 is deemed departing from the vehicle after having opened the trunk lid 2 and removed at least one item from the trunk, the trunk lid actuator 11 is controlled for automatic closing of the trunk lid 2.

The tracking of the location of the user 41 is performed by means of the vehicle exterior sensor system 40. The vehicle exterior sensor system 40 may be specifically provided for the task of tracking the location and departure of user from the vehicle 1. Alternatively, a vehicle exterior sensor system 40 provided for vehicle self-driving purpose may be used for performing said tracking of the user 41. The vehicle exterior sensor system 40 may for example include one or more types of sensor devices, such as at least one of, or a combination of, a camera, a lidar sensor, a laser scanning sensor, a radar sensor, or an ultrasound sensor.

Figure 10:
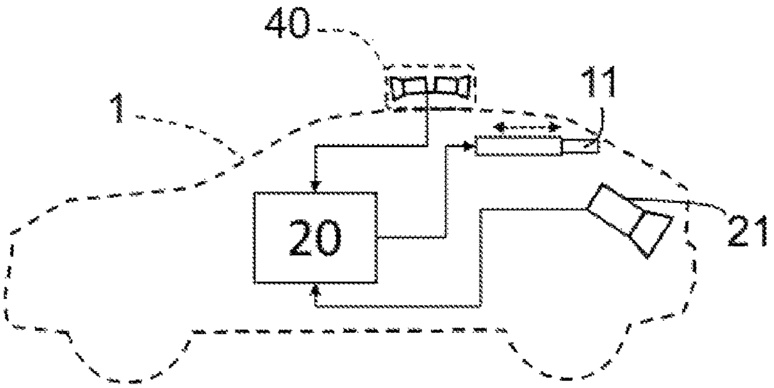
FIG. 10 shows schematically an overview of the system according to a further example embodiment of the disclosure.

The sensor device(s) of the vehicle exterior sensor system 40 may for example be located at the exterior of the vehicle 1, i.e. outside of the vehicle 1 such as on the roof as illustrated on FIG. 10. One or more sensor device(s) of the vehicle exterior sensor system 40 may alternatively or additionally be located in the front, rear and/or sides of the vehicle 1. Furthermore, one or more sensor device(s) of the vehicle exterior sensor system 40 may alternatively or additionally be located within the vehicle 1 and arranged for detecting the location and movement of the user on the outside of the vehicle 1, such as through one or more vehicle windows.

As mentioned above, the control unit 20 is arranged for controlling the trunk lid actuator 11 for automatic closing of the trunk lid 2 when said user 41 is departing from the vehicle 1, in particular departing from an immediate area of the vehicle 1. The criteria for determining exactly when a user is deemed departing from the vehicle 1 may involve various rules, such as an estimated distance between the user 41 and the vehicle 1, the motion pattern of the user 41 in the area surrounding the vehicle 1, an estimated speed of the user 41, or the like.

For example, the user may be deemed departing from the vehicle 1 when an estimated distance between the user 41 and the vehicle 1 is greater than for example 3-25 meters, specifically 5-15 meters. The distance triggering the automatic closure of the trunk lid 2 may then also be influenced by for example the motion pattern of the user 41 in the area surrounding the vehicle 1, and/or the estimated speed of the user 41. For example, a user 41 that repeatedly moves slightly away and then back to the vehicle, or along a winding motion pattern in the area surrounding the vehicle may indicate that the user 41 is doing some type of work and/or reloading of cargo, thereby possibly resulting in an increased trigger distance for triggering the automatic closure of the trunk lid 2. Moreover, a user 41 that moves relatively slowly for any reason may possibly result in reduced trigger distance for triggering the automatic closure of the trunk lid 2, because otherwise the trunk lid 2 may remain open for excessive length of time when the user 41 is slowly departing from the vehicle 1.

Alternatively, the user may be deemed departing from the vehicle 1 when the user 41 has departed from the vehicle 1 and has not returned with a certain time length, such as for example about 5-60 seconds, specifically 10-20 seconds.

The above-mentioned example embodiment will be described more in detail with reference to FIG. 9, which schematically shows a top-view of an urban environment having first street 42 crossing a second street 43 in a crossing 44, and with various buildings 45 arranged along said streets 42, 43, and with other vehicles 46 being parked or driven along said streets 42, 43. FIG. 9 shows a scenario wherein a user 41 has parked the vehicle 1 along the side of the first street 42, opened the trunk lid 2, removed at least one item therefrom, and subsequently departed from the vehicle without closing the trunk lid 3.

In such a scenario, the control unit 20 would have detected opening of the trunk lid 2, and detected, by means of the trunk sensor system 21, removal of at least one item from the trunk by a user 41. the control unit 20 would then have tracked the location of the user 41 by means of the vehicle exterior sensor system 40 along a motion path 46, and upon reaching a criteria corresponding to the user 41 departing from the vehicle 1, the control unit 20 would have controlled the trunk lid actuator 11 for automatic closing of the trunk lid 2. For example, the criteria corresponding to the user 41 departing from the vehicle 1 may be when the vehicle exterior sensor system 40 detects that the user 41 has moved away a certain distance 47 from the vehicle, as schematically illustrated by the dotted circle 48 surrounding the vehicle.

Said distance 47 from the vehicle may for example be calculated based from the location of the luggage trunk 7, or from the location of the center of the vehicle 1.

Figure 11:
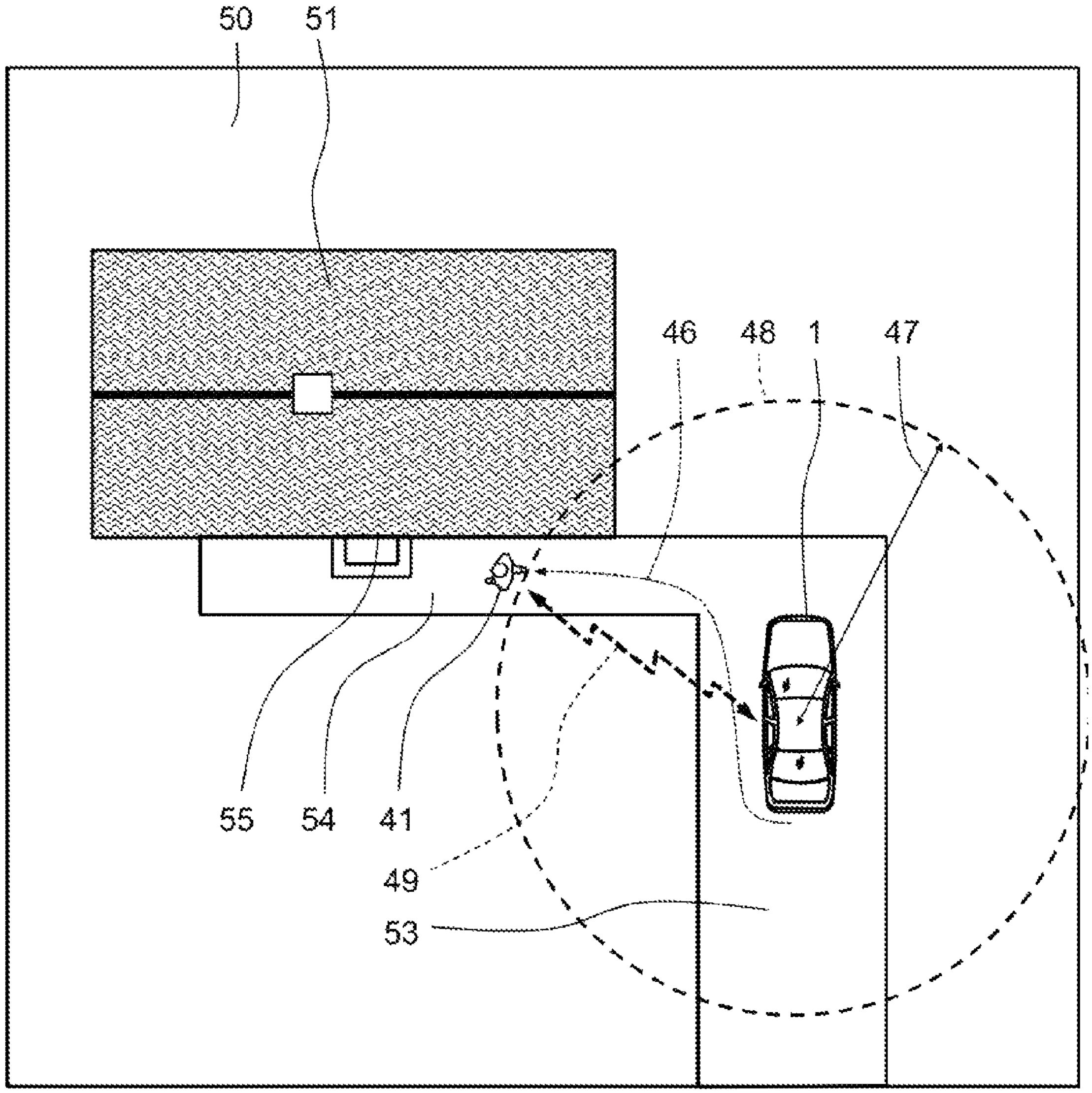
FIG. 11-12 show schematic illustrations of various example embodiments of the system implemented in a suburban or rural environment.

The above-mentioned example embodiment will be further described more in detail with reference to FIG. 11, which schematically shows a top-view of a suburban or rural environment having a garden 50 with a stand-alone house 51, such as a single-family home, a parking lot 53 for a vehicle and a walking path 54 connecting the parking lot with entrance door 55 of the house 51. FIG. 11 shows a scenario wherein a user 41 has parked the vehicle 1 on a parking lot in the garden 50, departed from the vehicle, opened the trunk lid 2, removed at least one item therefrom, and subsequently walking away on the walking path 54 towards the housing entrance door 55, without closing the trunk lid 3.

In such a scenario, the control unit 20 would have detected opening of the trunk lid 2, and detected, by means of the trunk sensor system 21, removal of at least one item from the trunk by a user 41. The control unit 20 would then have tracked the location of the user 41 by means of the vehicle exterior sensor system 40 along a motion path 46, and upon reaching a criteria corresponding to the user 41 departing from the vehicle 1, the control unit 20 would have controlled the trunk lid actuator 11 for automatic closing of the trunk lid 2. As before, the criteria corresponding to the user 41 departing from the vehicle 1 may be when the vehicle exterior sensor system 40 detects that the user 41 has moved away a certain distance 47 from the vehicle, as schematically illustrated by the dotted circle 48 surrounding the vehicle, or when the user 41 has departed from the vehicle 1 and has not returned with a certain time length, such as for example about 5-60 seconds, specifically 10-20 seconds.

Figure 9:
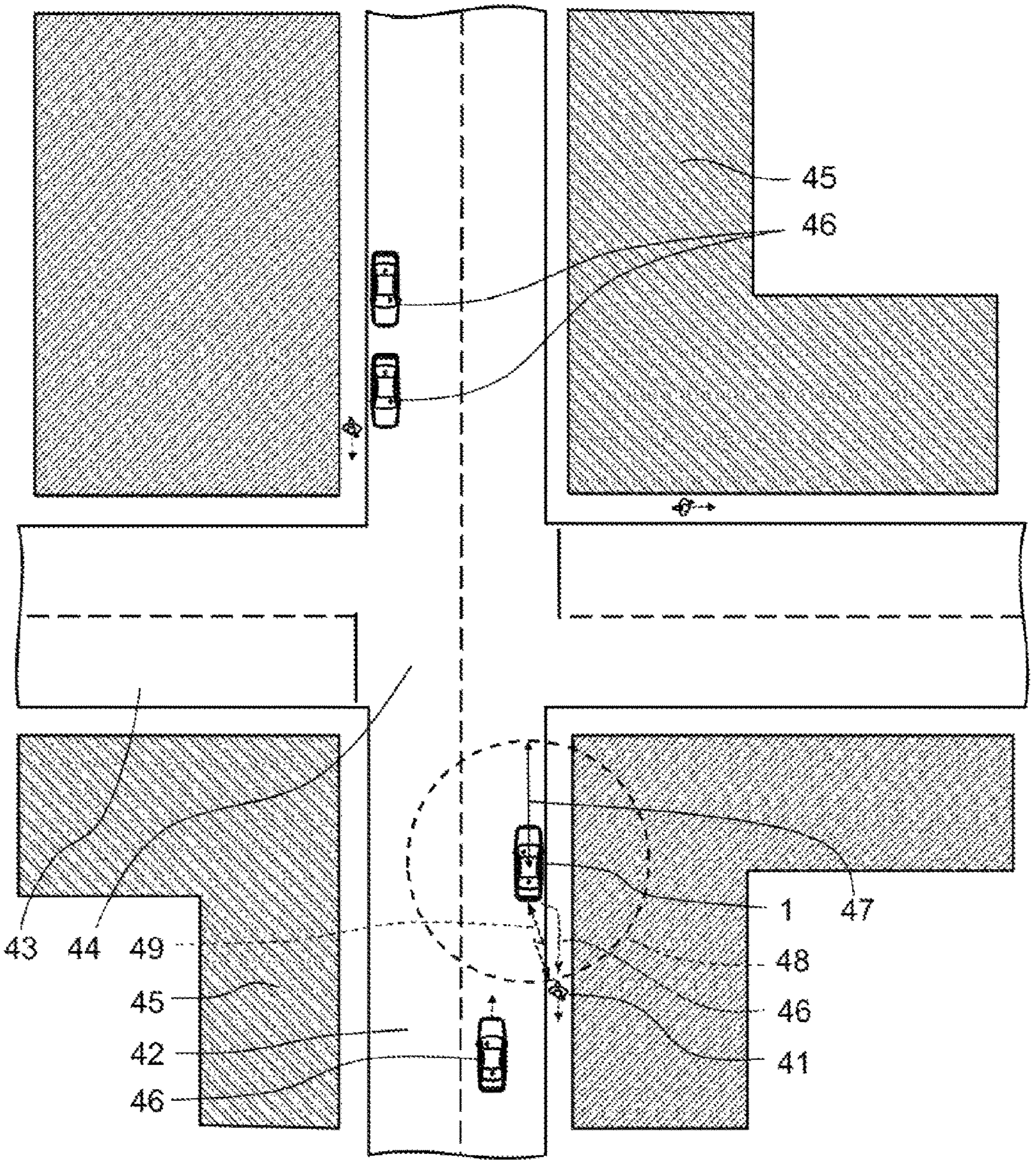
FIG. 9 shows a schematic illustration of an example embodiment of the system implemented in an urban environment.

The distance 47 and/or time length of non-return of the user used for triggering automatic closure of the trunk lid 2 may be different in the scenario of FIG. 11 compared with the scenario of FIG. 9. Specifically, by taking into the vehicle position at the place of parking, the distance and/or time length may be longer in more safe areas, i.e. areas with less criminal activity, such as burglary etc. In other words, the distance 47 and/or time length may be relatively small when parking in for example urban area, as depicted by FIG. 9, compared with when parking in for example suburban or rural areas, as depicted by FIG. 11.

Consequently, the system for automatically closing a trunk lid of a vehicle may further comprise a vehicle position detection system for detecting a position of the vehicle, wherein the control unit is configured for determining a timing of the closure of the trunk lid upon said departure of the user from the vehicle taking into account said detected vehicle position. The timing of the closure of the trunk lid may for example be derived based on the distance 47 and/or time length of non-return of the user, as described above.

The vehicle position detection system for detecting the position of the vehicle may be for example detect a geographical location, such as a GPS-device, and the timing of the closure of the trunk lid may then for example be determined taking into account relevant information, such as criminal activity or the like, associated with the present parking location, which relevant information may be retrieved from a local or remote memory or server. Alternatively, or in combination, the vehicle position detection system for detecting the position of the vehicle may be for example detect a parking category, such as urban street, suburban/rural street, a public parking garage, within private garage, or the like. The type of parking category may for example be automatically derived based on exterior environmental information collected by the vehicle exterior sensor system 40, or the like, using the control unit 20 or a remote computing resource.

According to a further example embodiment of the system for automatically closing a trunk lid of a vehicle, with reference to FIGS. 1A-3B and 9-11, the system comprises a trunk sensor system 21 configured for detecting items 23-26 in a luggage trunk 7, a trunk lid actuator 11 for automatic closing of the trunk lid 2, and a control unit 20 connected to the trunk sensor system 21 and to the trunk lid actuator 11, wherein the system further comprises a vehicle key fob or a mobile communication device having a virtual vehicle key for vehicle access, and wherein said control unit 20 is arranged for detecting opening of the trunk lid 2, detecting, by means of the trunk sensor system, removal of at least one item 23-26 from the trunk 7 by a user, monitoring a distance 47 between the vehicle 1 and the vehicle key fob, or between the vehicle 1 and the mobile communication device, and controlling the trunk lid actuator 11 for automatic closing of the trunk lid 2 when said distance 47 exceeds a threshold level.

In schematic FIGS. 9 and 11, the user 41 is deemed carrying the vehicle key fob or a mobile communication device upon departing from the vehicle 1.

A vehicle key fob typically refers to a device that needs to be at least brought along during a journey for enabling access into, and starting of the vehicle. The key fob may include a physical key, or not. A mobile communication device may for example be a smartphone, a smart watch, a tablet or the like.

Consequently, the present example embodiment does neither necessarily involve any estimation of one or more items or a combination of items that are statistically frequently allowed to remain in the luggage trunk after a journey, nor tracking of the user using a vehicle exterior sensor system 40. Instead, the distance between the user 41 and the vehicle is simply determined using a vehicle key fob or a mobile communication device carried by the user. The distance may for example be determined based on signal strength of the key fob or mobile communication device, as detected by a vehicle communication unit associated or connected with the control unit 20. The signal strength refers to the amplitude of a wireless electromagnetic signal 49 associated with a short-range communication transmission or communication channel between the vehicle and the key fob or mobile communication device.

For example, the threshold level may be about 3-25 meters, specifically 5-15 meters. The dotted circle 48 surrounding the vehicle 1 in FIGS. 9 and 11 may be deemed representing the threshold value.

Moreover, as described above, the system for automatically closing a trunk lid of a vehicle may further comprise a vehicle position detection system for detecting a position of the vehicle, wherein the control unit is configured for determining said threshold level taking into account said detected vehicle position. In other words, the threshold level may vary depending on the exterior surrounding environment.

According to still a further example embodiment of the system for automatically closing a trunk lid of a vehicle, with reference to FIGS. 1A-3B and 12, the system comprises a trunk sensor system 21 configured for detecting items 23-26 in a luggage trunk, a trunk lid actuator 11 for automatic closing of the trunk lid 2, and a control unit 20 connected to the trunk sensor system 21 and to the trunk lid actuator 11, wherein the system further comprises a remote smart home device 60, and wherein said control unit 20 is arranged for detecting opening of the trunk lid 2, detecting, by means of the trunk sensor system 21, removal of at least one item 23-26 from the trunk 7 by a user 41, controlling the trunk lid actuator 11 for automatic closing of the trunk lid 2 when receiving information from the remote smart home device 60 indicating that the user 41 is about to enter, or has already entered, a building or apartment 51 associated with the smart home device 60.

The remote smart home device is for example any of, or a combination of, an interior and/or exterior surveillance camera, a house or apartment security system, a house or apartment entrance door lock, a house or apartment entrance door opening detector, a house or apartment interior and/or exterior lighting system, a refrigerator, a coffee machine, a virtual assistant.

Figure 12:
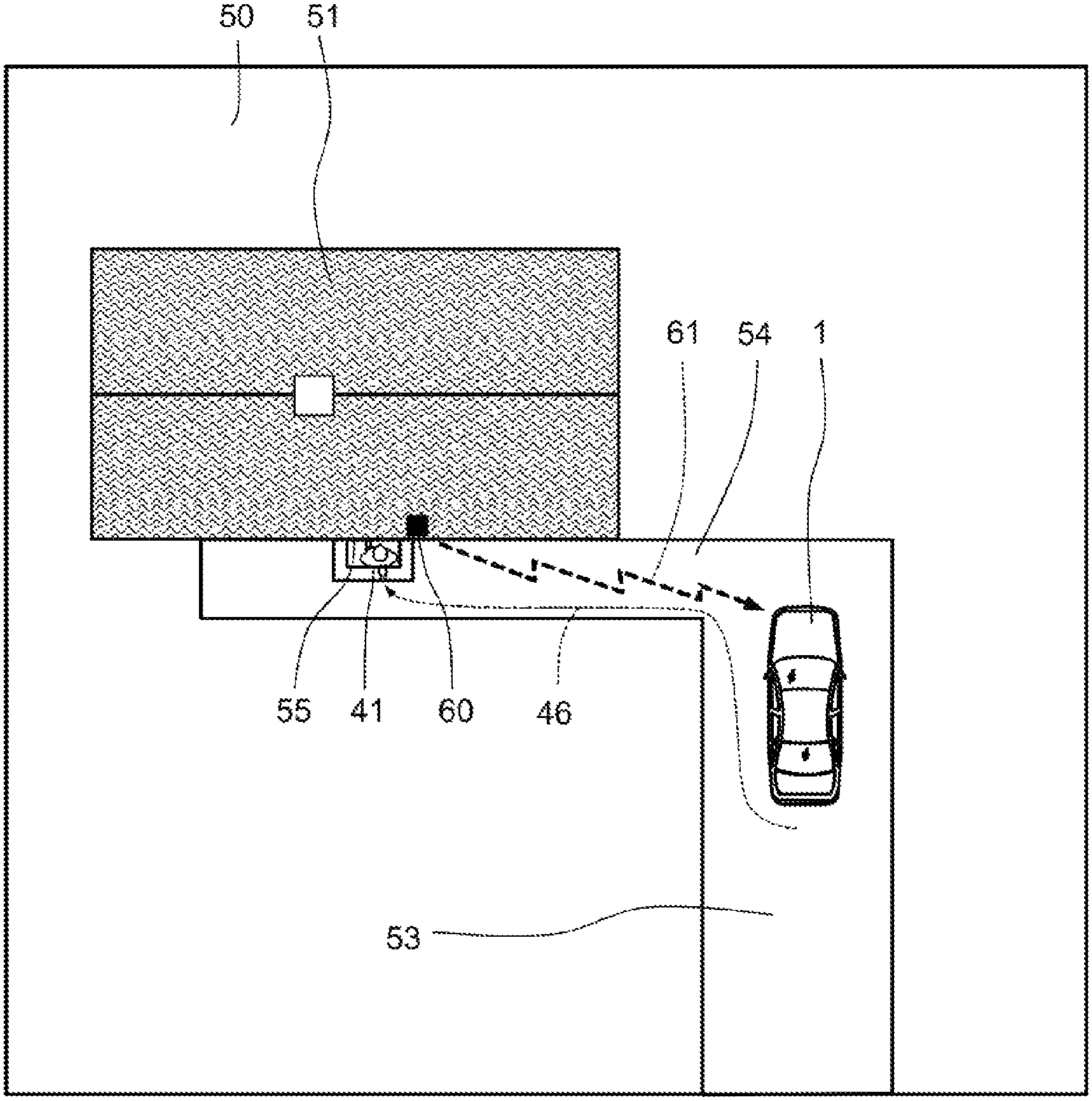

In the example embodiment described with reference to FIG. 12, the remote smart home device 60 may for example be an entrance door lock of the house 51 or a security system of the house 51, wherein the remote smart home device 60 is configured to transmit a signal 61, i.e. a wireless signal, to a vehicle communication unit associated or connected with the control unit 20 upon detecting that the user 41 unlocks the door lock or cancels the house security alarm. Consequently, thereby the vehicle control unit 20 is informed that the user has departed from the vehicle and may initiate control of the actuator 11 for automatic closing of the trunk lid 2.

Moreover, as described above, the system for automatically closing a trunk lid of a vehicle may further comprise a vehicle position detection system for detecting a position of the vehicle, wherein the control unit 20 is configured for determining a timing of the closure of the trunk lid 2 upon receiving said information from the remote smart home device 601 indicating that the user is about to enter, or has already entered, a building or apartment associated with the smart home device 60, taking into account said detected vehicle position.

Furthermore, the vehicle position may also, or alternatively, be used for determining which automatic trunk lid 3 closure strategy to select, if more than one is available. In other words, the control unit 20 may select to close the trunk lid 2 when an estimated distance 47 between the vehicle and user 41 exceeds a certain value, such as a threshold value, when parking in urban environment, and the control unit 20 may select to close the trunk lid 2 when receiving a notification from the smart home device 60 when parking in a suburban or rural environment.

The current weather condition at the location of the vehicle may also be taken into account when determining said threshold level or determining a timing of the closure of the trunk lid 2. For example, the system and method for automatically closing a trunk lid 2 of a vehicle may be configured to initiate earlier closure of the trunk lid 2 in case of rain or snowfall, compared to timing of the closure of the trunk lid 2 in case of sunny or dry weather condition.

Weather condition information at the location of the vehicle may for example be acquired by the vehicle exterior sensor system 40, or a dedicated weather sensor of the vehicle, or a vehicle rain sensor, or from a remote server accessible via wireless communication. In other words, the control unit 20 may be configured for determining said threshold level taking into account current weather condition at the location of the vehicle, or determining a timing of the closure of the trunk lid 2 upon receiving said information from a remote smart home device indicating that the user is about to enter, or has already entered, a building or apartment associated with the smart home device, taking into account current weather condition at the location of the vehicle, or determining a timing of the closure of the trunk lid 2 upon said departure of the user from the vehicle taking into account current weather condition at the location of the vehicle.

According to some example embodiments, the control strategies for controlling the trunk lid actuator for automatic closing of the trunk lid described above with reference to FIGS. 9-12, i.e. automatic closure of the trunk lid when the vehicle user is deemed departing from the vehicle as detected by means of the vehicle exterior sensor system 40, or when a distance between a key fob or a user's mobile device or the like, and the vehicle, exceeds a threshold level, or when receiving information from the remote smart home device 60, may be combined with the control strategy described above with reference to FIGS. 3A-8, i.e. the statistical approach.

For example, when the control unit 20 or another processing unit cannot draw any statistically reliable conclusion about when to initiate automatic closure of the trunk lid based on the available statistical data, the control unit 20 may instead rely on any of the control strategies described above with reference to FIGS. 9-12.

Furthermore, when a new user starts using the vehicle, the control unit 20 or another processing unit may be configured to apply any of the control strategies described above with reference to FIGS. 9-12 above while gathering statistical data about the luggage trunk use of the new user, and as soon statistically reliable conclusions about the user can be deducted, the control unit 20 may switch control strategy and start initiating automatic closure of the trunk lid based on the available historical usage data.

Moreover, the control unit 20 may collect and store statistical data about the luggage trunk use of a plurality of different users and subsequently apply an individual and user-specific control strategy for automatic closure of the trunk lid based on the available historical usage data for each specific user.

Moreover, the control unit 20, or another processing unit, may further be controlled to detect the presence of a person in the vehicle 1, and to block the automatic closure of the trunk lid 2 of the vehicle when the presence of a person in the vehicle 1 is detected.

Figure 13:
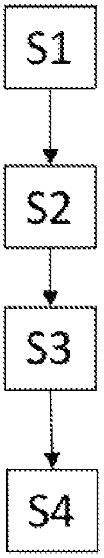
FIG. 13-16 show schematic illustrations of various flowcharts associated with example embodiments of the method for closing a trunk lid according to the disclosure.

A first example embodiment of a computer-implemented method for automatically closing a trunk lid of a vehicle luggage trunk will now be described with reference to FIG. 13. The method comprises a first step S1 of statistically determining, based on a set of observations of a trunk interior space by means of the trunk sensor system 21 in connection with termination of a set of vehicle travels, the item or items or combination of items 23-26 that are frequently remaining in the luggage trunk 7 after completed travel, while preferably taking into account the one or more items 23-26 stored in the luggage trunk 7 during the travel.

The method further comprises a second step S2 of detecting opening of a trunk lid 2, and a third step S3 of detecting current one or more items 23-26 in the luggage trunk 7 by means of the trunk sensor system 21. The second and third steps may alternatively be performed in opposite order.

The method further comprises a fourth step of controlling the trunk lid actuator 11 for automatic closing of the trunk lid 2 when the one or more current items correspond to said one or more items 23-26 or combination of items that are frequently remaining in the luggage trunk 7 after a journey.

The first step S1 of statistically determining the item or items or combination of items 23-26 that are frequently remaining in the luggage trunk 7 after completed travel, may for example involve holding a list of trunk items updated by observation of a trunk interior space by means of a trunk sensor system when the vehicle is locked and parked, wherein a trunk item refers to an item that is frequently stored in the trunk when the vehicle is locked and parked. Observation of the trunk interior space may for example be performed each time vehicle is locked and parked, or more seldom.

Figure 14:
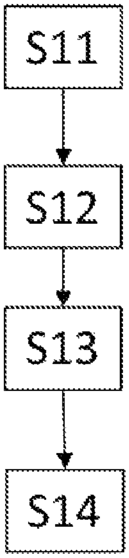

A further example embodiment of a computer-implemented method for automatically closing a trunk lid of a vehicle luggage trunk will now be described with reference to FIG. 14. The method comprises a first step S11 of detecting opening of a trunk lid, and second step S12 of detecting, by means of a trunk sensor system, removal of at least one item from the trunk by a user, a third step S13 of tracking a location of said user by means of a vehicle exterior sensor system, and a fourth step S14 of controlling a trunk lid actuator for automatic closing of the trunk lid when said user is departing from the vehicle.

Figure 15:
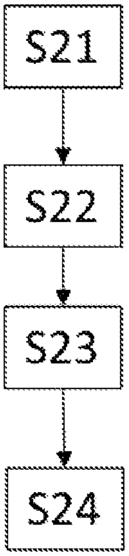

A further example embodiment of a computer-implemented method for automatically closing a trunk lid of a vehicle luggage trunk will now be described with reference to FIG. 15. The method comprises a first step S21 of detecting opening of a trunk lid, a second step S22 of detecting, by means of a trunk sensor system, removal of at least one item from the trunk by a user, a third step S23 of monitoring a distance between the vehicle 1 and a vehicle key fob, or between the vehicle 1 and a mobile communication device having a virtual vehicle key for vehicle access, and a fourth step S24 of controlling a trunk lid actuator for automatic closing of the trunk lid when said distance exceeds a threshold level.

Figure 16:
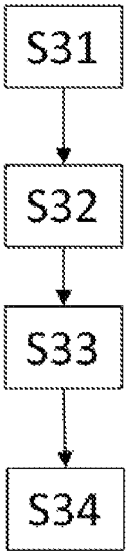

Still a further example embodiment of a computer-implemented method for automatically closing a trunk lid of a vehicle luggage trunk will now be described with reference to FIG. 16. The method comprises a first step S31 of detecting opening of a trunk lid, a second step S32 of detecting, by means of a trunk sensor system, removal of at least one item from the trunk by a user, and a third step S33 of controlling the trunk lid actuator for automatic closing of the trunk lid when receiving information from a remote smart home device indicating that the user is about to enter, or has already entered, a building or apartment associated with the smart home device.

The system and method for automatic closure of the trunk lid may additionally involve automatic locking of the vehicle in connection with completed automatic closure of the trunk lid.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the system for automatically closing a trunk lid of a vehicle, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor(s) associated with the control unit of the system for automatically closing a trunk lid of a vehicle may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Although discussed above as methods described by the flowchart of FIGS. 13-16, it should be appreciated that one or more of the operations discussed may be performed in any order and do not necessarily imply an order as provided. Rather, the methods discussed are merely one embodiment of the present disclosure as contemplated.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A system for automatically closing a trunk lid of a vehicle, the system comprising:
- a trunk sensor system configured for detecting items in a luggage trunk,
- a trunk lid actuator for automatic closing of the trunk lid,
- a control unit connected to the trunk sensor system and to the trunk lid actuator, wherein said control unit is arranged for:
- statistically determining, based on a set of observations of a trunk interior space by means of the trunk sensor system in connection with termination of a set of vehicle travels, one or more items or combination of items that are statistically predicted to remain in the luggage trunk after completed travel,
- detecting opening of the trunk lid,
- detecting current items in the luggage trunk by means of the trunk sensor system, and controlling the trunk lid actuator for automatic closing of the trunk lid when the current items correspond to said one or more items or combination of items that are statistically predicted to remain in the luggage trunk after a journey.

2. The system according to claim 1, wherein said control unit is arranged for controlling the trunk lid actuator for automatic closing of the trunk lid after a certain time period, irrespective of detected current items within the luggage trunk.

3. The system according to claim 1, wherein the trunk sensor system includes at least one of, or a combination of, a camera, a lidar sensor, a laser scanning sensor, a radar sensor, an ultrasound sensor.

4. A vehicle comprising a system according to claim 1.

5. The vehicle according to claim 4, wherein the trunk sensor system is located within an interior trunk space of the vehicle.

6. A computer-implemented method for automatically closing a trunk lid of a vehicle luggage trunk, the method comprising:
- statistically determining, based on a set of observations of a trunk interior space by means of the trunk sensor system in connection with termination of a set of vehicle travels, the one or more items or combination of items that are statistically predicted to remain in the luggage trunk after completed travel,
- detecting opening of a trunk lid,
- detecting current items in the luggage trunk by means of the trunk sensor system, and
- controlling the trunk lid actuator for automatic closing of the trunk lid when the current items correspond to said one or more items or combination of items that are statistically predicted to remain in the luggage trunk after a journey.

7. The computer-implemented method according to claim 6, further comprising controlling the trunk lid actuator for automatic closing of the trunk lid after a certain time period, irrespective of detected current items within the luggage trunk.

8. The computer-implemented method according to claim 6, further comprising providing a trunk sensor system within an interior trunk space.

9. The computer-implemented method according to claim 6, wherein the trunk sensor system includes at least one of, or a combination of, a camera, a lidar sensor, a laser scanning sensor, a radar sensor, an ultrasound sensor.

10. The system according to claim 1, wherein the statistically determining takes into account the one or more items stored in the luggage trunk during the travel.

11. The computer-implemented method according to claim 6, wherein the statistically determining takes into account the one or more items stored in the luggage trunk during the travel.

* * * * *